(12) United States Patent
Ohmi et al.

(10) Patent No.: US 6,193,212 B1
(45) Date of Patent: Feb. 27, 2001

(54) FLUID CONTROL VALVE AND FLUID SUPPLY/EXHAUST SYSTEM

(75) Inventors: Tadahiro Ohmi, 1-17-301, Komegabukuro 2-chome, Aoba-ku, Sendai-shi, Miyagi-ken 980 (JP); Migaku Takahashi, 20-2 Hitokida 2-chome, Taihaku-ku, Sendai-shi, Miyagi-ken 982-02 (JP); Michio Yamaji, Osaka-fu (JP); Tsuyoshi Tanikawa, Osaka-fu (JP); Nobukazu Ikeda, Osaka-fu (JP); Ryosuke Dohi, Osaka-fu (JP); Kouji Nishino, Osaka-fu (JP); Naofumi Yasumoto, Osaka-fu (JP); Hiroyuki Fukuda, Osaka-fu (JP); Tomio Uno, Osaka-fu (JP); Yasuyuki Yanai, Miyagi-ken (JP)

(73) Assignees: Tadahiro Ohmi; Migaku Takahashi; Tohoku Steel Co., Ltd., all of Miyagi-ken; Fujiken Inc., Osaka, all of (JP)

( * ) Notice: Subject to any disclaimer, the term of this patent is extended or adjusted under 35 U.S.C. 154(b) by 0 days.

(21) Appl. No.: 09/308,922

(22) PCT Filed: Dec. 1, 1997

(86) PCT No.: PCT/JP97/04377

§ 371 Date: Jul. 23, 1999

§ 102(e) Date: Jul. 23, 1999

(87) PCT Pub. No.: WO98/25062

PCT Pub. Date: Jun. 11, 1998

(30) Foreign Application Priority Data

Dec. 1, 1996 (JP) .................................................. 8-334866
Dec. 2, 1996 (JP) .................................................. 8-321276
Dec. 4, 1996 (JP) .................................................. 8-323995

(51) Int. Cl.[7] .......................... F16K 31/02; F16K 37/00; H01F 7/08; H01F 3/00; H01F 7/02

(52) U.S. Cl. .................................. 251/129.16; 251/129.1; 251/129.17; 251/129.18; 137/554; 335/266; 335/297; 335/302

(58) Field of Search .......................... 251/129.1, 129.16, 251/129.17, 129.18, 335.3; 137/884, 556, 269; 335/266, 297, 302

(56) References Cited

U.S. PATENT DOCUMENTS

| 3,633,869 | * | 1/1972 | Lehmann | 251/129 |
| 4,165,762 | * | 8/1979 | Acar | 137/625.5 |
| 4,291,358 | * | 9/1981 | Dettmann et al. | 251/129 |

(List continued on next page.)

FOREIGN PATENT DOCUMENTS

| 59-133884 | 8/1984 | (JP) . |
| 62-20980 | 1/1987 | (JP) . |

(List continued on next page.)

*Primary Examiner*—Joseph A. Kaufman
*Assistant Examiner*—D. Austin Bonderer
(74) *Attorney, Agent, or Firm*—Randall J. Knuth

(57) ABSTRACT

A fluid control valve, which can control a fluid having a pressure in the order of 10 kg/cm$^2$, has a response time in the order of several milliseconds can be made small in size, and a fluid supply/exhaust system that provides less gas counter flow in the event of a plurality of valves being used. A fluid control valve of the invention controls a fluid moving in a valve body by closing and opening a portion between a valve seat and a valve holder by use of a drive unit. The drive unit has a rod-shaped shaft for application of pressure through the valve seat and the valve holder, and a member "a" fixed around the rod-shaped shaft. The member "a" is made from a magnetic material, and has a space between it and the shaft. A coil provided in parallel to the shaft, moves the shaft via the member "a" up and down by electromagnetic induction, and makes use of a spring force to close and open a portion between the valve seat and the valve holder.

17 Claims, 14 Drawing Sheets

U.S. PATENT DOCUMENTS

| | | | | |
|---|---|---|---|---|
| 4,621,660 | * | 11/1986 | Klocke | 251/129.09 X |
| 4,757,943 | * | 7/1988 | Sperling et al. | 251/129.17 X |
| 4,829,947 | * | 5/1989 | Lequesne | 251/129.1 X |
| 4,988,907 | * | 1/1991 | Irwin | 310/181 |
| 5,094,429 | * | 3/1992 | Dostert | 251/129.06 |
| 5,165,652 | * | 11/1992 | Nicolaisen | 251/51 |
| 5,386,849 | * | 2/1995 | Gilchrist et al. | 251/129.17 X |
| 5,458,048 | * | 10/1995 | Hohner | 137/884 |
| 5,548,263 | * | 8/1996 | Bulgatz et al. | 251/129.18 X |
| 5,566,718 | * | 10/1996 | Nagai et al. | 137/884 |
| 5,699,830 | * | 12/1997 | Hayashi et al. | 137/554 |
| 5,804,962 | * | 9/1998 | Kather et al. | 251/129.16 X |

FOREIGN PATENT DOCUMENTS

| | | |
|---|---|---|
| 62-188872 | 8/1987 | (JP) . |
| 63-318380 | 12/1988 | (JP) . |
| 1-241103 | 9/1989 | (JP) . |
| 1-241104 | 9/1989 | (JP) . |
| 2-31088 | 2/1990 | (JP) . |
| 3-61776 | 3/1991 | (JP) . |
| 4-185981 | 7/1992 | (JP) . |
| 5-133297 | 5/1993 | (JP) . |
| 6-207684 | 7/1994 | (JP) . |

* cited by examiner

FLUID CONTROL VALVE AND FLUID SUPPLY/EXHAUST SYSTEM

BACKGROUND OF THE INVENTION

1. Field of the Invention

The present invention relates to a fluid control valve and fluid supply/exhaust system. In greater detail, the present invention refers to a fluid control valve, and a fluid supply/exhaust system, in which a member "a" is made unitary with a rod shaped shaft which applies pressure to a valve holder and is moved upwardly and downwardly by a coil using electromagnetic induction, and thereby, the portion between the valve seat and the valve holder is opened and closed. The fluid control valve and fluid supply/exhaust system of the present invention is chiefly used in semiconductor manufacturing apparatuses.

2. Description of the Related art

Conventionally, fluid control valves which controlled fluids flowing through the valve body by means of opening and closing a portion between a valve body by means of opening and closing a portion between a valve seat and a valve holder using a drive unit and valve holders comprising a diaphragm and a diaphragm holder, and were of the following types:

One type having a rotating mechanism unit which is manually operated, in which a valve rod is moved upwardly and downwardly using the rotational movement of the rotating mechanism unit, and the portion between the valve seat and the diaphragm is opened and closed (hereinbelow, this type of fluid control valve is referred to as a manual valve (not shown in the figures));

A second type having a gas filling and discharge mechanism, in which the valve rod is moved upwardly and downwardly using a difference in pressure in this gas, and the portion between the valve seat and the diaphragm is opened and closed (hereinbelow, this type of fluid control valve is referred to as an air pressure valve, (FIG. 4)); and A third type having a mechanism which is subject to electromagnetic induction using a coil, wherein an iron core and plunger are installed at separate locations using this mechanism, and in concert with this, a bubble disc affixed to a plunger is moved upwardly and downwardly, and a portion between the bubble disk and a valve seat is opened and closed (hereinbelow, this type of fluid control valve is referred to as an electromagnetic valve (FIG. 5)).

Hereinbelow, the method of opening and closing the valve in electromagnetic valves and air pressure valves, which are referred to as automatic valves, will be explained.

FIG. 4 is a schematic cross sectional view of an air pressure valve of a type in which the open and closed state of the valve is normally closed; the state is depicted in which the valve is closed. The opening and closing operation of the value is given below.

Closed to Open Operation

As a result of filling an instrumentation gas input port 01 with an instrumentation gas by means of an instrumentation gas changeover switch (not shown), an actuator 402 pushes upward, and simultaneously therewith, a rod shaped valve rod 403 which is affixed to actuator 402 is pushed upward, so that the diaphragm 404, which is pushed against by valve rod 403, separates from valve seat 405, and the fluid output port 407.

Open to Closed Operation

As a result of ceasing the filling of the instrumentation gas input port 401 with the instrumentation gas by means of the instrumentation gas change over switch (not shown), the actuator 402, and the rod shaped valve rod 403 which is affixed to the actuator 402, are pushed downward as a result of the force of spring 408, and diaphragm 404 is pushed by valve rod 403 and diaphragm 404 comes into contact with valve 405, and the flow of the fluid from fluid input port 406 to fluid output port 407 is halted.

FIG. 5 is a schematic cross section view of an electromagnetic valve in which the valve state is normally closed; the state is depicted in which the valve is closed. The opening and closing operation of the valve is as follows.

Closed to Open Operation

As a result of inputting electricity from terminal 501 and causing a current flow in coil 502, electromagnetic induction is set up in coil 502, and the iron core 503 affixed to the case and plunger 504 come into contact, and along with this, the valve disk 505 which is affixed to plunger 504 is pushed upward, so that the valve disk 505 and the valve seat 506 are separated, and fluid flows from valve input port 507 to valve output port 508.

Open to Closed Operation

By cutting off the flow of current to coil 502, the magnetic field of coil 502 is eliminated, and the plunger 504 which was in contact with iron core 503 separates therefrom, and as a result, the valve disk 505 which was affixed to plunger 504 is pushed downward by the force of a screw 509, so that valve disk 505 and valve seat 506 come into contact, and the flow of fluid from fluid input port 507 to fluid output port 508 is stopped.

However, it has been discovered by the present inventors that these valves exhibit the following problems with respect to the response time (i.e., the amount of the time required from the state in which the valve was closed to that in which it is opened).

(1) In the case of the manually operated valve, the time required to rotate the handle is the response time, so that there are differences produced depending on the individual operators, and it is extremely difficult to stably conduct the opening and closing operation of the valve in less than, for example, 100 msec, and as the number of valves to be operated increases, it is not merely the case that the time required increases, but it is also possible to make mistakes in the order of operation and to cause counter flow and the like.

(2) The air pressure valve, which is also termed an automatic valve, has a structure which is highly airtight, and can be easily controlled so long as the fluid pressure is 10 $kg/cm^2$ or less. However, in the air pressure valve, the time required for the charging and discharging of the gas into the drive unit occupies approximately 90 percent of the response time, so that the opening and closing operation of the valve is slow, at several tens of milliseconds, and as a result of the length of the instrumentation tube which supplies the gas, or the pressure at which the gas is supplied, the response time of the valves may differ. As a result, irregularities are produced in the operational order of the valves and the actual operating order, and there are cases in which counter flow is produced.

(3) As a method of eliminating the problems in (2) above, a method has been employed in which the length of each instrumentation tube and the gas pressure within each instrumentation tube is set to the same value.

However, in, for example, fluid control devices for semiconductor manufacturing apparatuses and the like, in those apparatuses which employ a large number of fluid control valves, electromagnetic valves and the like are employed in order to charge and discharge gas in the drive units of the air pressure valves; however, because the distances between the electromagnetic valves and the air pressure valves differ for each instrumentation tube, it is necessary to arrange the lengths of each instrumentation tube to the fluid control valve which is at the greatest distance. For this reason, storage space is required in the fluid control valve for unnecessary instrumentation tubes, and with respect to the entirety of the fluid control device, as well, it is only possible to construct a system in which the rate is determined by the fluid control valve having the longest response period.

(4) As described above, electromagnetic valves are preferentially employed in the charging and discharging of gas in the drive units of the air pressure valves. In particular, as can be understood from the structure, the valves can be rapidly opened and closed within a few milliseconds. However, as is clear from this use, the structure is such as to permit gas leakage, and furthermore, there is a large amount of dead space within the valves. For this reason, such valves are not suited for uses such as the precise control of the special gases in semiconductor manufacturing processes.

The present invention has as an object thereof to provide a fluid control valve, and a fluid supply/discharge system in which fluid can be stable controlled at a press of approximately 10 kg/cm$^2$, the valves are high speed, having a response time of few milliseconds, and the miniaturization of the valve, and, since an instrumentation system is not required, the miniaturization of the fluid supply and exhaust system is possible, and in the case in which a system is constructed using a plurality of valves, there is little counter flow of the gas.

SUMMARY OF THE INVENTION

According to the present invention the fluid control valve in which a fluid moving through the valve body is controlled by the opening and closing of the portion between a valve seat and valve holder using a drive unit, wherein this drive unit comprises a rod shaped shaft which applies pressure via a valve holder and a valve rod, and a member "a" which is fixed around the rod shaped shaft; the member "a" is made from a magnetic material, and has a space between it and the shaft, and a coil provided at a position parallel to the shaft moves the member "a" upwardly and downwardly by electromagnetic induction and makes use of a spring force to open and close a portion between the valve seat and the valve holder.

By means of these characteristics, the present invention has the following functions.

By moving the member "a", which is made unitary with the rod shaped shaft applying pressure via the valve holder and the valve rod, upwardly and downwardly by means of magnetic induction in the coil, and also employing a spring force, the portion between the valve seat and the valve holder is opened and closed, so that it is possible to omit the operation period involved in the charge and discharge of gas in the drive unit in the air pressure valve, and thus a fluid control valve is obtained which has a high response speed of a few milliseconds in the opening and closing of the valve.

(b) Because it is not necessary to provide the instrumentation tubes, which were necessary in the air pressure valves in order to conduct the charging and discharging of gas in the drive units, or the electromagnetic valves, which were employed in order to conduct the charging and discharging of gas in the drive unites of the air pressure valves, the problems involved in the differences in response times of the valves as a result of the pressure of the gas supplied and the length of the instrumentation tubes, the problems involved in the necessity for storage space of the unnecessary instrumentation tubes, and the problems involved in the entire fluid control apparatus in that a system could only be constructed in which the rate was limited by the fluid control valve having the longest response time, are all solved.

(c) Because member "a" is constructed from a magnetic material, member "a" has a saturated magnetic flux density, so that by means of the electrical field generated by the coil, it is possible to pull the member "a" at a high rate of speed in the direction of the coil. Accordingly, the shaft which is made unitary with member "a" can also be moved upwardly and downwardly at a high rate of speed, so that it is possible to stably conduct the opening and closing of the portion between the valve seat and the valve holder at a high rate of speed. As a result, a fluid control valve is obtained which has a small response time.

In the characteristics described above, the valve holder comprises a diaphragm and a diaphragm holder, so that the structure of the parts and contact with gas is simple, and there is little dead space, and it is possible to obtain a fluid control valve having superior gas replacement characteristics.

Furthermore, by disposing a bellows about the valve holder, it is possible to obtain a fluid control valve having superior durability in valve opening and closing.

Furthermore, by using, for member "a", a magnetic material comprising an iron/cobalt system alloy having a saturation magnetic flux density of 2 T (Tesla) or more, or by using, as member "a2", a magnetic material comprising an iron/nickel system alloy having a saturation magnetic flux density of 2 T (tesla) or more, it is possible to greatly reduce the volume of member "a", so that it is possible to achieve a miniaturization of the fluid control valve.

Furthermore, in the characteristics described above, by providing a mechanism for regulating the gap G positioned between the coil and member "a", it is possible to improve regulation of the valve stroke.

In the characteristics above, by providing, in the space between the shaft and coil, a member "b" comprising a magnetic material identical to that of member "a", it is possible to induce the magnetic flux flowing out from one end of the coil through the member "b" positioned between the shaft and the coil and into the other end of the coil. As a result, it is possible to effectively employ the magnetic flux generated by the coil, so that the power with which the coil pulls member "a" is increased, and it is possible to obtain a fluid control valve having an even smaller response time. Additionally, it is also possible to reduce the electromagnetic noise which exerts undesirable effects on the control system of the current flowing through the coil on the control system of the current flowing the coil and the like.

Furthermore, in the characteristics described above, by positioning, at a position in opposition to that of member "b" and thus sandwiching the coil, a member "c" comprising the same magnetic material as member "a", it is possible to induce the magnetic flux flowing out of one end of the coil through the member "c" positioned at the outside of the core and into the other end of the coil As a result, it is possible to effectively employ the magnetic flux generated by the coil, so that the force with which the coil pulls the member "a" increases, and it is possible to reduce the electromagnetic noise which exerts undesirable effects on other devices external to the fluid control valve.

Furthermore, in the characteristics described above, by providing, at a position in opposition to member "a" and sandwiching the coil, a member "d" comprising a magnetic material identical to that of member "a", the magnetic flux flowing out from one end of the coil at the side of member "d" is induced in the direction of the members "b", and "c" described above. On the other hand, the magnetic flux flowing out of one end of the coil at the side of member "a" is induced through members "b" and "c" described above into the other end of the coil; however, by providing member "d", the convergence of magnetic flux generated by the coil, so that the force with which the coil pulls the member "a" is increased, and it is possible to obtain a fluid control valve having a shorter response time.

Furthermore, by constructing the coil provided in parallel to the shaft from a plurality of coils disposed in series, then by means of the electromagnetic field generated by the coils described above, it is possible to increase the force with which member "a" is drawn in the direction of the coil at high speed, that is to say, to increase the drive force.

Additionally, by providing, between the plurality of coils arranged in series, members "e" comprising a magnetic material identical to that of member "a", it is possible to make uniform that drive force described above, that is to say, the force with which the member "a" is pulled at high speed in a direction of the coil as a result of the electric field generated by the coil, and this is preferable.

Furthermore, in the characteristics described above, the magnetic material contains 5 percent by weight of vanadium, so that the workability of the material is improved. For this reason, it is possible to construct the fluid control valve at low cost. Furthermore, when the magnetic material contains 5 weight percent or less of vanadium, then it is possible to reduce the magnetic resistance while maintaining the high saturation magnetic flux density of the magnetic material. Accordingly, the permeability of the magnetic material (saturation magnetic flux density/magnetic resistance) increases, so that it is possible to more strongly induce the magnetic field flowing out of the coil.

Furthermore, by supplying the exciting current which is supplied to the coil in a divided manner between a large initial drive current until the opening of the valve and a small maintenance current after opening which serves to maintain the open state, then it is possible to suppress the power consumed in the drive unit conducting the operation which pulls member "a" in the direction for the coil at high speed as a result of the electric field generated by the coil described above, and it is possible to prevent damage to the coil resulting from heat.

Furthermore, after the cut off of the exciting current supplied to the coil, by again supplying the exciting current to the coil for only a short period of time after a short period of time "t", the soft landing control of the valve holder is possible. That is to say, the pushing force of the spring in the direction for the valve seat is reduced, so that as a result of reducing the valves closing speed, the shock effect of the valve holder with respect to the valve seat is ameliorated, and this essentially eliminates the occurrence of damage in the valve seat or valve holder.

Furthermore, by making the structure one in which the gap G positioned between the coil and member "a", member "b", and/or member "c" is filled in a freely chargeable and dischargeable manner with a magnetic fluid, it is possible to reduce the magnetic resistance of the portion of gap G corresponding to the valve stroke. As a result, it is possible to achieve a miniaturization of the drive unit which conducts the operation of pulling member "a" in the coil direction at high speed by means of the electrical field generated by the coil described above.

Furthermore, by adopting a structure in which a resin film having a predetermined thickness is interposed between member "a", member "b", and/or member "c", it is possible to reduce the impact noise which may be generated as a result of the impact of the member "a" into member "b" and/or member "c" end surfaces during the valve opening operation.

In the fluid supply/exhaust system of the present invention constructed using fluid control valves such as those described above, no disparities are produced in the response time as a result of individual differences in the human operators or as a result of differences in instrumentation tube length or gas pressure, and furthermore, opening and closing operations can be achieved at high speed and in a constant manner by means of electrical signals, and moreover, a fluid supply/exhaust system which is small and has high reliability is made possible.

Furthermore, the system comprises fluid control valves, a unit control apparatus which is provided with a power source, a control unit, and a plurality of drive units, a control computer which is provided in a remote central control point, and communication lines which connect the control computer with the unit control apparatus; by means of conducting operations of the fluid control valves by means of operation signals S from the control computer, a simplification of the communication lines is possible, and it is possible to rapidly and accurately control a plurality of fluid control valves miniaturization and increase in control function of the fluid supply/exhaust system is possible.

Furthermore, by means of providing an opening and closing detecting apparatus in the various fluid control valves and making the structure one in which the open or closed state is communicated to the control computer via the unit control apparatus by means of signals P from the opening and closing detecting apparatuses, it is possible to detect errors in operation resulting from external noise and errors in operation and problems present in the fluid control valves themselves, and this is preferable.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE REFERENCES

| | |
|---|---|
| L | coil diameter |
| G | gap between member "a" and member "b" or member "c" |
| S | operating signal, |
| P | operating state signal, |
| I | exciting current, |
| F | magnetic suction force, |
| 24 | control computer, |
| 25 | unit control apparatus, |
| 26 | power source, |
| 27 | control unit, |
| 28 | drive unit, |
| 29 | communication port |
| 30 | communication line, |
| 31 | opening and closing detector, |
| 101 | terminal, |
| 102 | coil, |
| 103 | case, |
| 104 | member "a", |
| 105 | member "b", |
| 106 | member "c", |
| 107 | member "d", |
| 108 | shaft, |
| 109 | valve rod, |
| 110 | diaphragm holder, |
| 111 | diaphragm, |
| 112 | valve seat, |
| 113 | fluid input port, |
| 114 | fluid output port, |

-continued
DESCRIPTION OF THE REFERENCES

| | |
|---|---|
| 115 | spring, |
| 116 | bonnet, |
| 117 | screw affixing bonnet 116 and case 103, |
| 118 | screw affixing shaft 108 and plunger 119, |
| 119 | plunger, |
| 120 | actuator body, |
| 121 | valve body, |
| 122 | bonnet nut, |
| 123 | bellows, |
| 124 | member "e", |
| 125 | stopping screw, |
| 126 | valve holder, |
| 401 | instrumentation gas input port, |
| 402 | actuator, |
| 403 | valve rod, |
| 404 | diaphragm, |
| 405 | valve seat, |
| 406 | fluid input port, |
| 407 | fluid output port, |
| 408 | screw, |
| 409 | actuator cap, |
| 501 | terminal, |
| 502 | coil, |
| 503 | iron core, |
| 504 | plunder, |
| 505 | valve disk, |
| 506 | valve seat, |
| 507 | fluid input port |
| 508 | fluid output port |
| 509 | screw. |

DETAILED DESCRIPTION OF THE INVENTION

Figure 1:
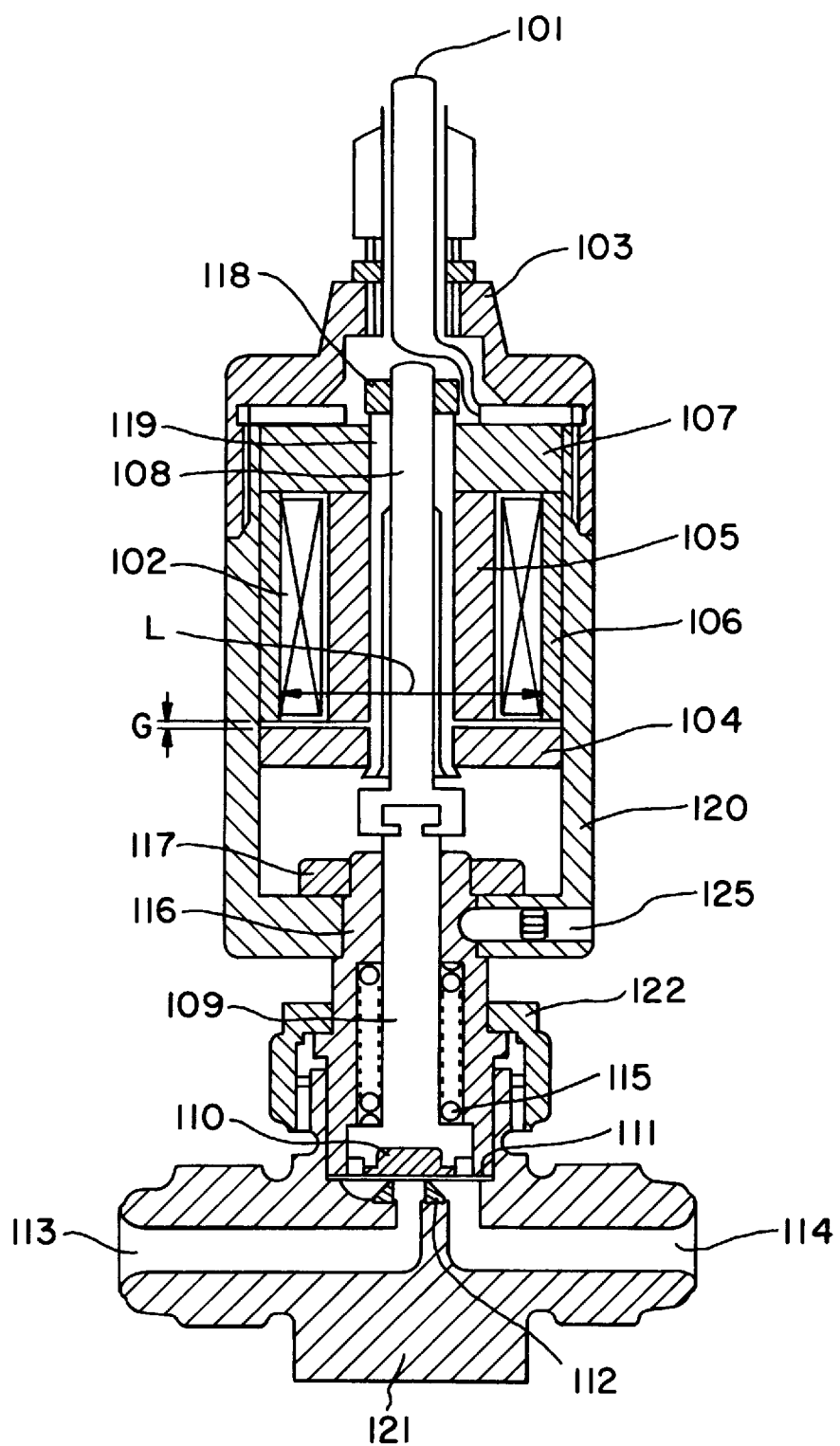
FIG. 1 is a schematic cross sectional view showing an example of a fluid control valve in accordance with the present invention.

In the preferred embodiment, FIG. 1 is a schematic cross sectional view showing an example of a fluid control valve in accordance with the present invention. In FIG. 1, reference 101 indicates a terminal, reference 102 indicates a coil, reference 102 indicates a case, reference 104 indicates member "a", reference 105 indicates member "b", reference 106 indicates member "c", reference 107 indicates member "d", reference 108 indicates a shaft, reference 109 indicates a valve rod, reference 110 indicates a diaphragm holder, reference 111 indicates a diaphragm reference 112 indicates a valve seat, reference 113 indicates a fluid input port, reference 114 indicates a fluid output port, reference 115 indicates a spring, reference 116 indicates a bonnet, reference 117 indicates a screw for attaching bonnet 116 and case 103, and reference 118 indicates a screw for attaching shaft 108 and bonnet 118.

Figure 14:
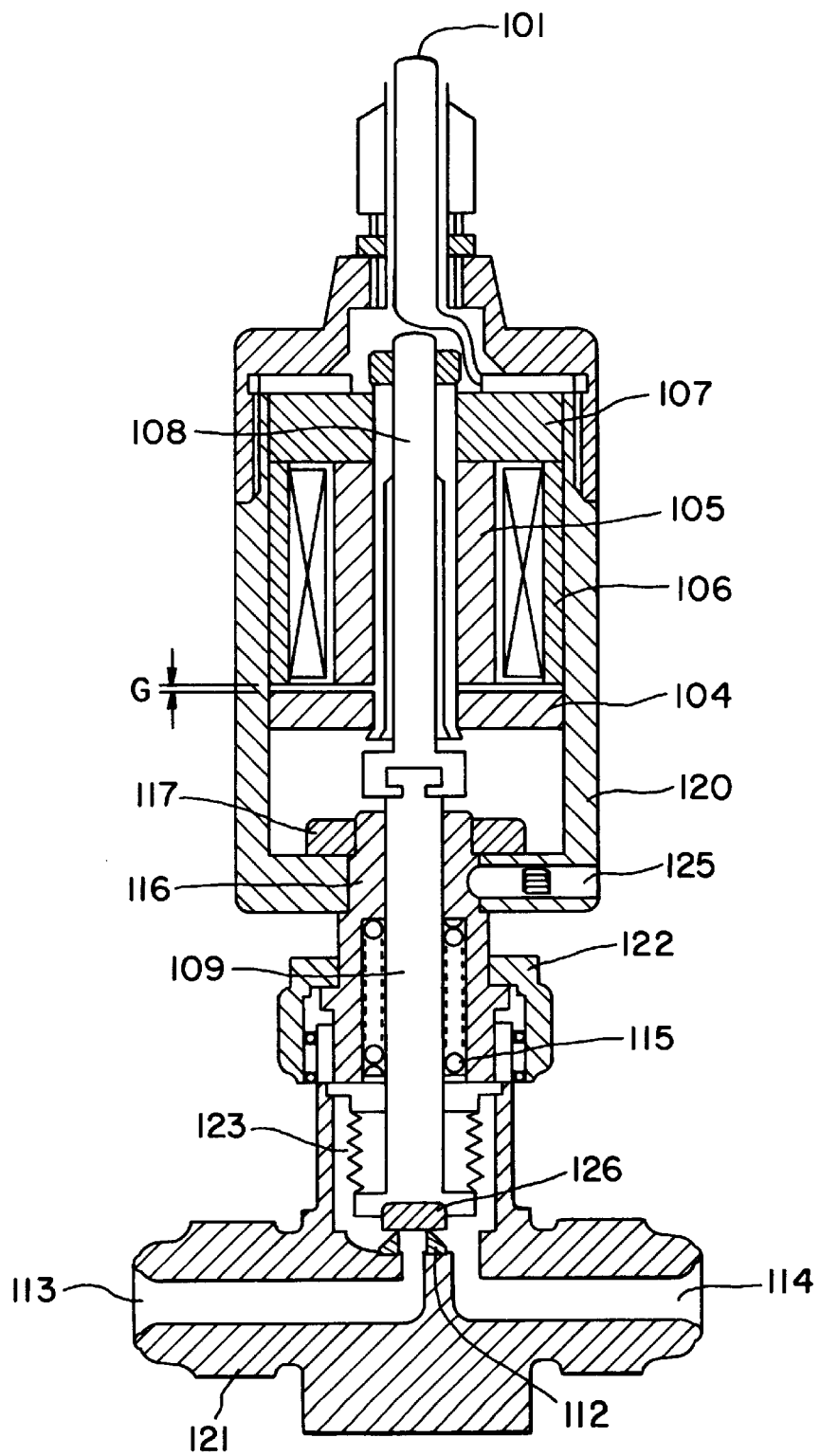
FIG. 14 is a schematic cross sectional view showing an example of a fluid control valve in accordance with a present invention in which a bellows is disposed about the valve holder.

As shown in FIG. 14, diaphragm holder 110 and diaphragm 111 may be made unitary with the valve holder, or a bellows may be disposed about the valve holder.

In the fluid control valve in accordance with the present invention, the drive unit which serves to open and close the portion between valve seat 112 and diaphragm 111 comprises a rod shaped shaft 10 for applying pressure to diaphragm 11 via diaphragm holder 110 and valve rod 109, and a member "a" (104) which is affixed about this rod shaped shaft 108.

Member "a" (104) preferably comprises a magnetic material comprising an iron/cobalt system alloy or an iron/nickel system alloy having a saturation magnetic flux density of 2 T (Tesla) or more.

Coil 102 is positioned in parallel with shaft 108 and a space is present between coil 102 and shaft 108. Coil 102 moves member "a" (104) upwardly and downwardly by means of electromagnetic induction, and by means of employing the force of spring 115, it is possible to open and close the space between valve seat 112 and diaphragm 111.

Furthermore, by appropriately disposing member "b" (105), member "c" (106), and member "d" (107), comprising a magnetic material identical to that of member "a" (104), about coil 102, the magnetic flux flowing out of one end of coil 102 may be induced into the other end of the coil via members, "b", "c", and "d". Accordingly, it is possible to effectively employ the magnetic flux generated by coil 102, so that the force with which coil obtain a fluid control valve having a shorter response time.

Furthermore, by employing a plurality of coils disposed in series, and by providing members "e" comprising magnetic material identical to that of member "a" between the plurality of coils, the drive force can be increase.

Furthermore, when 5 weight percent or less of vanadium is included in the magnetic material comprising member "a" (104), the workability to the material "a" is improved. Furthermore, the permeability of the magnetic material also increase, so that this is advantageous in that it is possible to more strongly induce the magnetic field flowing out from the coil.

Furthermore, by supplying the exciting current supplied to the coil in such a manner as to be divided into a large initial drive current up to the opening of the valve, and after the opening of the valve, a small maintenance current to maintain the opened state of the valve, it is possible to suppress the power consumption in the drive unit conducting the operation by which member "a" is pulled at high speed in the direction of the coil as a result of the electric field generated by the coil, and it is possible to prevent damage to the coil resulting from heat.

Furthermore, after the exciting current supplied to the coil is cut off, by supplying the re-exciting current to the coil for only a short period of time after the short time t, the soft landing control of the valve holder is made possible. In other words, the pushing force in the direction of the valve seat is reduced by the spring, so that the shock of the impact of the valve holder and valve seat is ameliorated as a result of a reduction in the valve opening speed, and it is possible to essentially eliminate the danger of damage to the valve seat or the valve holder.

Furthermore by providing a structure in which the gaps G between the coil and member "a", and member "b" and/or member "c", are filled with a magnetic fluid in a freely chargeable and dischargeable manner, it is possible to reduce the magnetic resistance of the parts of gap G corresponding to the valve stroke.

As a result, a miniaturization is possible of the drive units which conduct the operation of pulling member "a" at high speed in the direction of the coil a result of the electric field generated by the coil.

Furthermore, by providing a structure in which a resin film having a thickness of 0.05 mm is interposed between member "a" and member "b" and/or member "c", it is possible to reduce the impact noise which may be generated as a result of the impact between the member "a" and the end surfaces of the member "b" and/or member "c" during the valve opening operation.

Hereinbelow, the opening and closing operations of the fluid control valve in accordance with the present invention will be explained in detail based on FIG. 1. FIG. 1 is a schematic cross sectional view of a normally closed type in which the valve is closed.

Closing→Opening Operation

Electricity is inputted from terminal 101 into coil 102, and thereby, coil 102 is electromagnetically induced, and coil 102 and member "b", (105) and member "c" (106) affixed to case 103 come into contact with member "a1" or member "a2" (104) is pushed upwards, so that the diaphragm 111 which is pushed by shaft 108 and the valve seat 112 are separated, and fluid flows from fluid input port 113 to fluid output 114.

Opening→Closing Operation

Current is cut off to coil 102, and thereby the electromagnetic field of coil 102 is eliminated, and the member "a1" or member "a2" (104) which was in contact with member "b" (105) and member "c" (106) which are affixed to coil 102 and case 103 separates, and in accordance with this, the rod shaped shaft 108, which is affixed to member "a1" or member "a2", (104), is pushed downwards as a result of the force of spring 115, so that shaft 108 pushes on diaphragm 111, and both diaphram 111 and valve seat 112 come into contact, and the flow of a fluid from fluid input port 113 to fluid output prot 114 stops.

The fluid control valve of the present invention is a electrically controlled fluid control valve which conducts opening and closing operations at high speed and in a standard manner with respect to electrical signals, and which is, moreover, small and of high reliability, and furthermore, in order to increase the reliability, it is preferable that chromium oxide passivation treatment, which provides superior resistance to lack of water, corrosion resistance, and non-catalytic properties to the surfaces of the parts in contact with gas, and fluoride passivation treatment, which provides superior corrosion resistance to fluorides, be conducted.

Hereinbelow, the fluid control valve and fluid supply and exhaust system of the present invention will be explained with reference to the figures; however, the present invention is in no way limited to the embodiments described.

In one embodiment of the present invention, the member is used to construct the fluid control valve shown in FIG. 1 various materials having a saturation magnetic flux density Bs within a range of 0.5 to 2.3 Teslas (Fe, Fe—Co, system alloy, Fe—Ni system alloy, and the like), the coil diameter: L which permitted the opening and closing operation for the valve was investigated. The coil diameter: L was altered by varying the number of turns of coil 102 within a range of 750 to 1500 T (0.3 mφ, 12.6 Ω·20° C.). At this time, the length of the coil in the direction of the shaft was fixed at a predetermined value.

Figure 6:
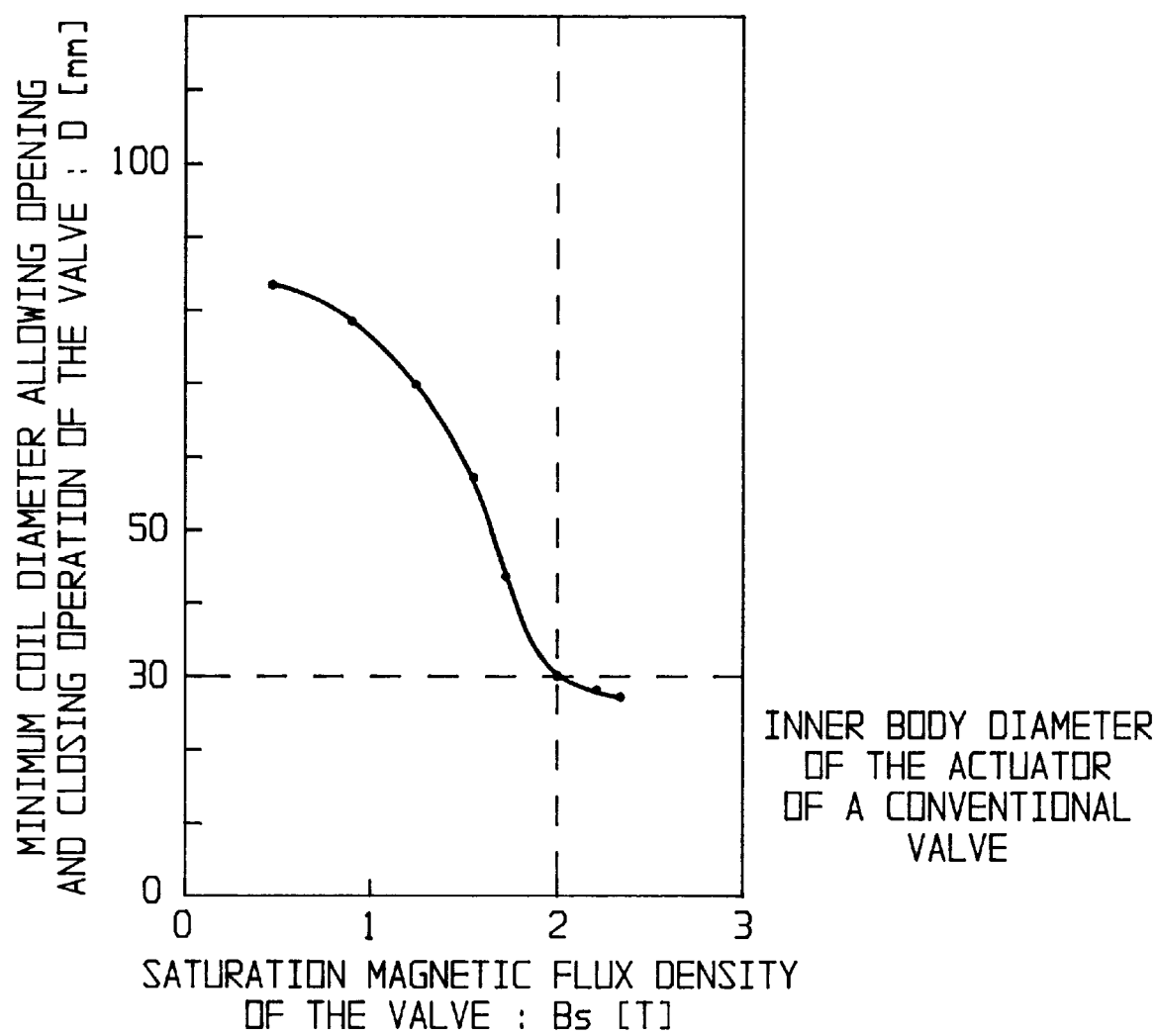
FIG. 6 is a graph showing the relationship between the saturation magnetic flux density of the member "a" used in the fluid control valve and the diameter of the coil which makes possible the opening and closing operation of the valve.

FIG. 6 is a graph showing the relationship between the saturation magnetic flux density of the member "a" used to produce the fluid control valve and the coil diameter permitting the opening and closing operation for the valve.

The following points are clear from FIG. 6.

(1) As Bs increases, a reduction in the coil diameter which permits the opening and closing operation of the valve is possible.

(2) In order to set a coil diameter: L which is equal to or less than the inner diameter (approximately 30 mm) of the actuator body of the fluid control valves which are presently marketed, it is necessary to employ a material having a saturation magnetic flux density Bs of 2.0 Teslas or more in the member "a".

(3) Furthermore, in the case of a coil diameter: L which is less than or equal to the inner diameter (approximately 30 mm) of the actuator body of standard fluid control valves, during installation (when the junction installed in the valve is connected with other members), the problem of difficulties of connecting the junction to the valve which are caused by a large coil diameter can be avoided.

In a second embodiment of the present invention, two separate members are employed as the member "a" which is used to produce the fluid control valve shown in FIG. 1: a member "a1" (comprising a magnetic material comprising an iron/cobalt system alloy), and a member "a2" (comprising a magnetic material comprising an iron/nickel system alloy), and the valve response times (that is to say, the time required from the closed state of the valve to the opened state of the valve) was measured while altering the saturation magnetic flux density for the two types of members. The member "a1" and member "a2" having differing saturation magnetic flux density materials were produced by altering the composition ratios of the various alloys.

However, in the present embodiment, members "b", "c", and "d" which are shown in FIG. 1 were not employed, and the positions at which these three members were provided were made into empty space.

The coil diameter was set to 30 mm and the other points were identical to those of embodiment 1.

Figure 2:
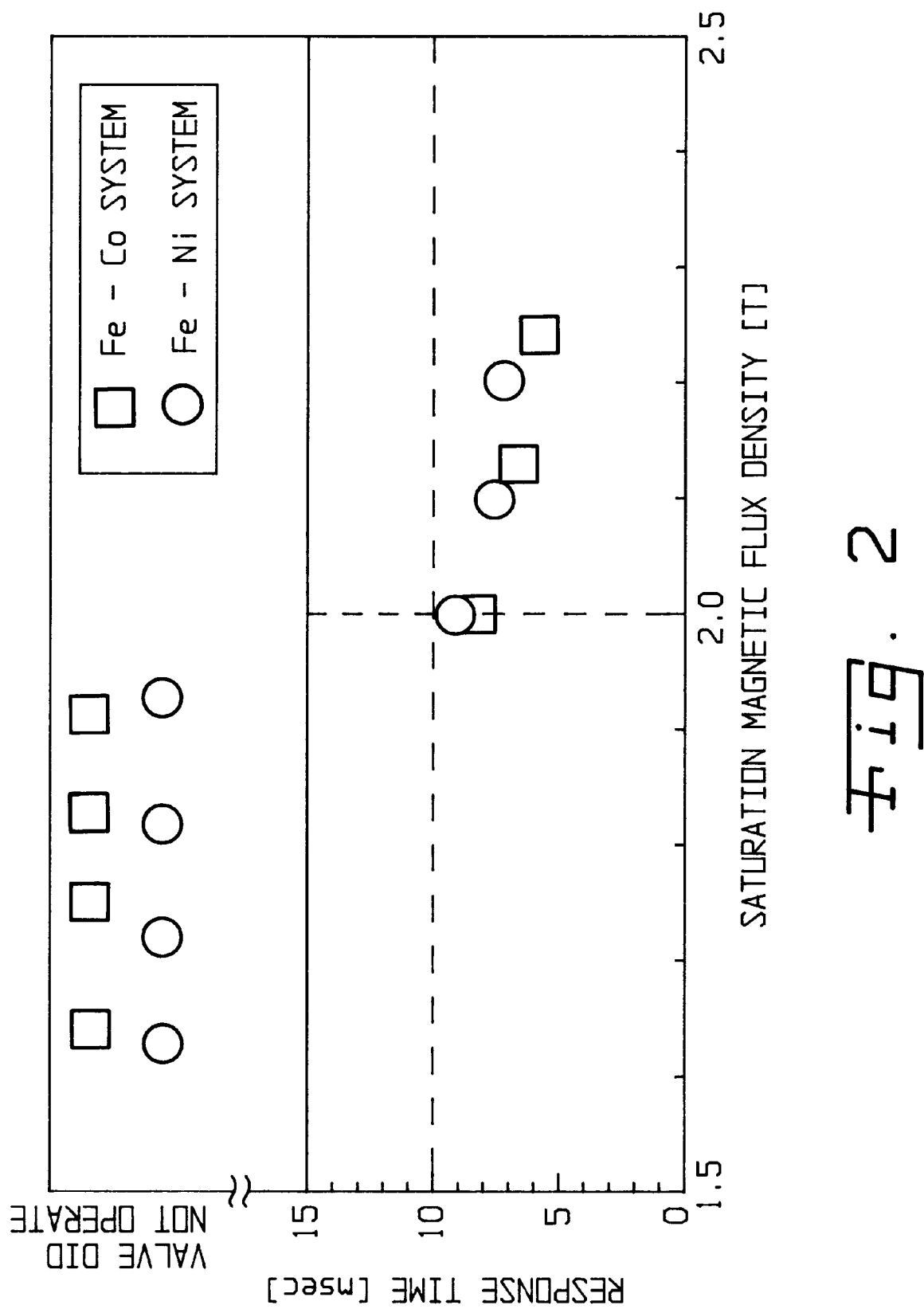
FIG. 2 is a graph showing the relationship between the saturation magnetic flux density of the magnetic material of member "a1" and member "a2", and the opening and closing state of the valve and the response time thereof.

FIG. 2 is a graph showing the relationship between the saturation magnetic flux density of member "a1" and member "a2" and the response time. Furthermore, in FIG. 2, the opening and closing state of the valve is shown in which a gas (nitrogen) is filled from the fluid input port at a pressure of 10 kg/cm$^2$, and using the force of a spring, the diaphragm is pushed against the valve seat, and thereby, gas flow is stopped, and from this state, a current is passed through a coil at a fixed voltage, and by means of the resulting electromagnetic induction, member "a1" or member "a2" is drawn upward with a force stronger than that of the spring, and the gas filling the fluid input port is supplied to the fluid output port.

The following points are clear from the results of FIG. 2.

(1) When the saturation magnetic flux density of member "a1" and member "a2" is less than 2 T (Teslas), the valve did not operate (the valve did not move from a closed to an opened state).

(2) When the saturation magnetic flux density of member "a1" and member "a2" was 2 T (Teslas) or more, the valve operated (the valve changed from a closed state to an opened state).

(3) In the region in which the valve operated (that is to say, the region in which the saturation magnetic flux density of member "a1" and member "a2" was 2 T (Teslas) or more), a response time of 10 msec or less was obtained.

Figure 8:
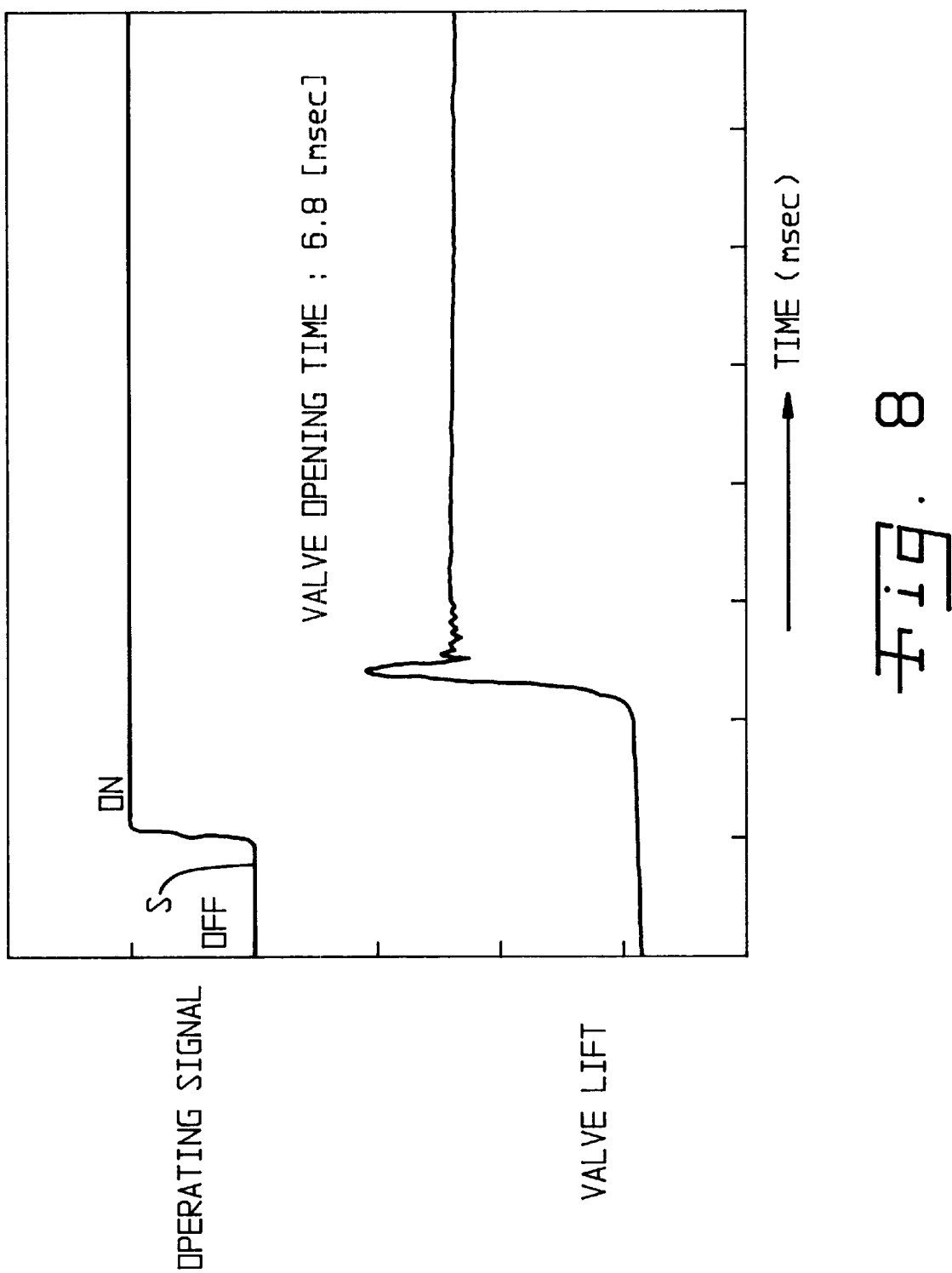
FIG. 8 is a graph showing the valve opening operation characteristics of the fluid control valve of FIG. 1.
Figure 9:
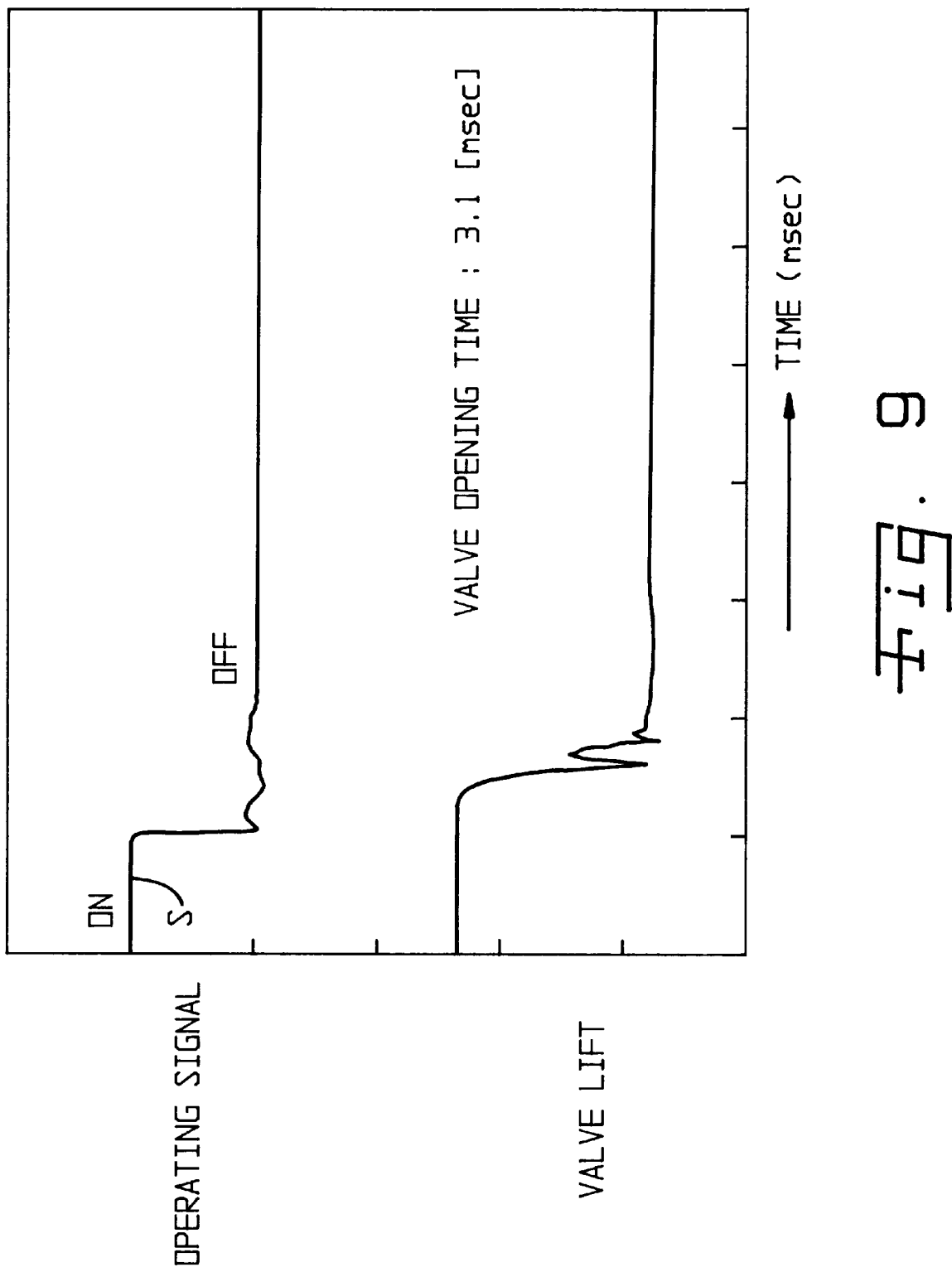
FIG. 9 is a graph showing the valve closing operation characteristics of the fluid control valve of FIG. 1.

More concrete measurement results are shown in FIGS. 8 and 9. FIGS. 8 and 9 show the operating characteristics during the opening operation and the closing operation of the fluid control valve shown in FIG. 1, and during the opening of the valve, after approximately 0.007 seconds from the point at which operational signal S enters the ON state, the valve becomes fully open (a valve lift of approximately 0.3 mm). Furthermore, during the closing of the valve, after approximately 0.0031 sec from the point at which operational signal S is in the OFF state, the valve enters a fully closed state.

That is to say, in the case of the fluid control valve of the present invention, it is possible to change the valve from fully closed to fully open at a high speed of approximately 0.01 second or less, and it is possible to change the valve from a fully opened to a fully closed state in approximately 0.005 seconds or less. In other words, in comparison with conventional air pressure valves, the flow control valve of the present invention maintains approximately the same outer dimensions of the drive unit with respect to height, width, and depth, but achieves an approximately tenfold increase in the operating speed of the valve.

Accordingly, using the valve structure in accordance with the present invention, and by employing a member "a1" and a member "a2" having a saturation magnetic flux density of 2 T (Teslas) or more, it is possibly to stably control the response time at a level of a few milliseconds of a gas at a pressure of 10 kg/cm$^2$ or less.

In embodiment three of the present invention, the case will be considered in which a mechanism for regulating the gap G between the coil and the member "a" is provided.

As shown in FIG. 1 to the inside of the cylindrical plunger 119, a shaft (SUS316) 108 of a nonmagnetic material formed so as to by unitary with the upper end of valve rod 109 is inserted, and by screwably engaging an affixing screw 118, which was affixed to the upper end of the plunger 119 with the screw part provided on the upper end of shaft 108, plunger 119 is supported and affixed on shaft 108 in such a manner as to be capable of upward and downward positional adjustment. By means of such a structure, a mechanism is provided for adjusting the gap G between the coil 102 and the member "a" 104.

In other words, shaft 108 is urged in a downward direction by spring 115 with a force F of approximately 17 kgf, and by adjusting the amount of tightening of screw 118, the plunger 119 is moved in the upward or downward direction, and by means of this, the gap G between the member "a" 104 and the lower end surface of coil 102, the operating stroke G, is adjusted to, for example, 0.4 mm.

Figure 7:
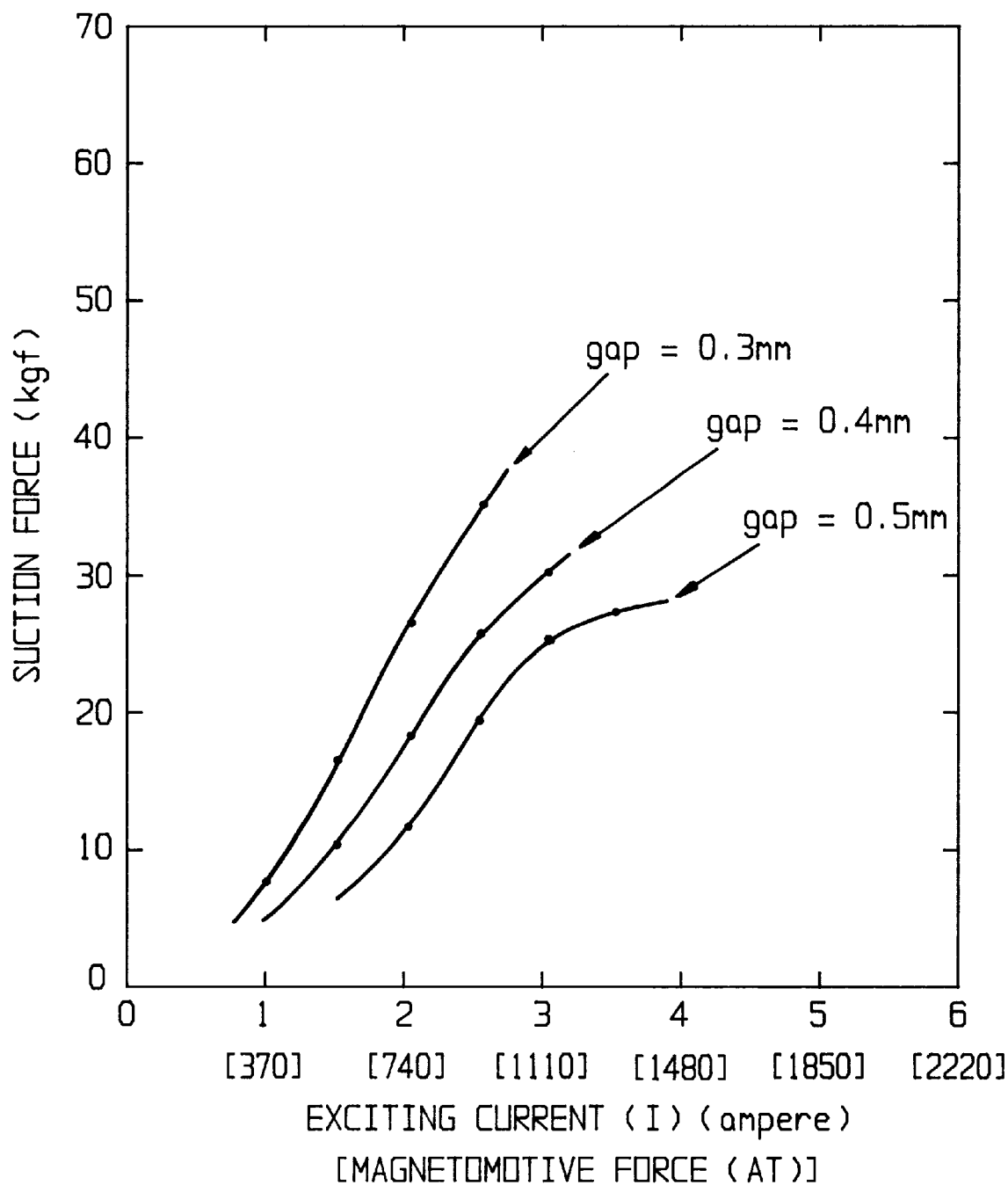
FIG. 7 is a linear diagram showing the relationship between the exciting current I flowing in the coil of the fluid control valve in accordance with the present invention, the suction force F, and the initial gap G.

FIG. 7 is a graph showing the results to an investigation into the relationship between the exciting current and the suction force in the drive unit of FIG. 1 when the initial gap G is altered.

It can be seen from FIG. 7 that when G was set at 0.4 mm, a suction force of 20 kgf was obtained using an exciting current of approximately 2.3 A.

In the present embodiment, the plunger suction force of the drive unit was set to approximately 20 kgf (when the plunger operating stroke was set to approximately 0.4 mm); however, it is possible to appropriately regulate this by means of the force F of spring 115.

Furthermore, in the present embodiment, valve rod 109 and shaft 109 were made unitary; however, these may also be formed so as to be separate.

In a fourth embodiment of the present invention, the difference from embodiment 1 is that members "b", "c", and "d"are disposed in the fluid control valve shown in FIG. 1. A magnetic material was used for member "a1" which comprised an iron cobalt system alloy having a saturation magnetic flux density of 2.2 T (Teslas). The magnetic material which was employed for members "b", "c", and "d" was the same as that of member "a1". Furthermore, the dispositions of members "b", "c" and "d" were conducted in the combinations shown in Table 1.

Other points were identical to those of embodiment 2.

In table 1, the results of the measurement of the valve response time under conditions identical to those of embodiment 2 are shown. However, the response times shown in Table 1 represent values standardized by dividing response times obtained when using each combination of members by response times obtained in embodiment 1 employing only member "a1" (that is to say, in which members "b", "c", and "d" were not used).

TABLE 1

| Member Combination | Member Name | | | | Standardized Response Time |
|---|---|---|---|---|---|
| | "a1" | "b" | "c" | "d" | |
| 1 | Present | Absent | Absent | Absent | 1 |
| 2 | Present | Present | Absent | Absent | 0.97 |
| 3 | Present | Present | Present | Absent | 0.94 |
| 4 | Present | Present | Present | Present | 0.92 |

From Table 1, it can be seen that by appropriately disposing member "b" (105), member "c" (106), and member "d" (107), which comprise magnetic material identical to that of member "a1", (104), round coil 102, the magnetic flux flowing out of one end of coil 102 is induced into other end of the coil via members "b", "c", and "d", so that it is possible to effectively employ the magnetic flux generated by coil 102. As a result, the force by which coil 102 pulls member "a1" is increased, and a fluid control valve having a shorter response time is obtained.

The results above refer to the time required to change the state of the valve from the closed state to the opened state; however, the same results were obtained for the time required to change the state of the valve from the opened state to the closed state.

In the present example, results were shown which employed member "a1" (using a magnetic material comprising an iron-cobalt system alloy); however, even if member "a2" (using a magnetic material comprising an iron-nickel system alloy) is employed in place of member "a1", it was confirmed that similar results to those in the present embodiment were obtained when members "b", c, and d comprised the same magnetic material as member "a2".

In the present embodiment, members "b", "c", and "d" and the actuator body 120 had a cylindrical shape; however, these may also have the shape of a square tube.

Figure 13:
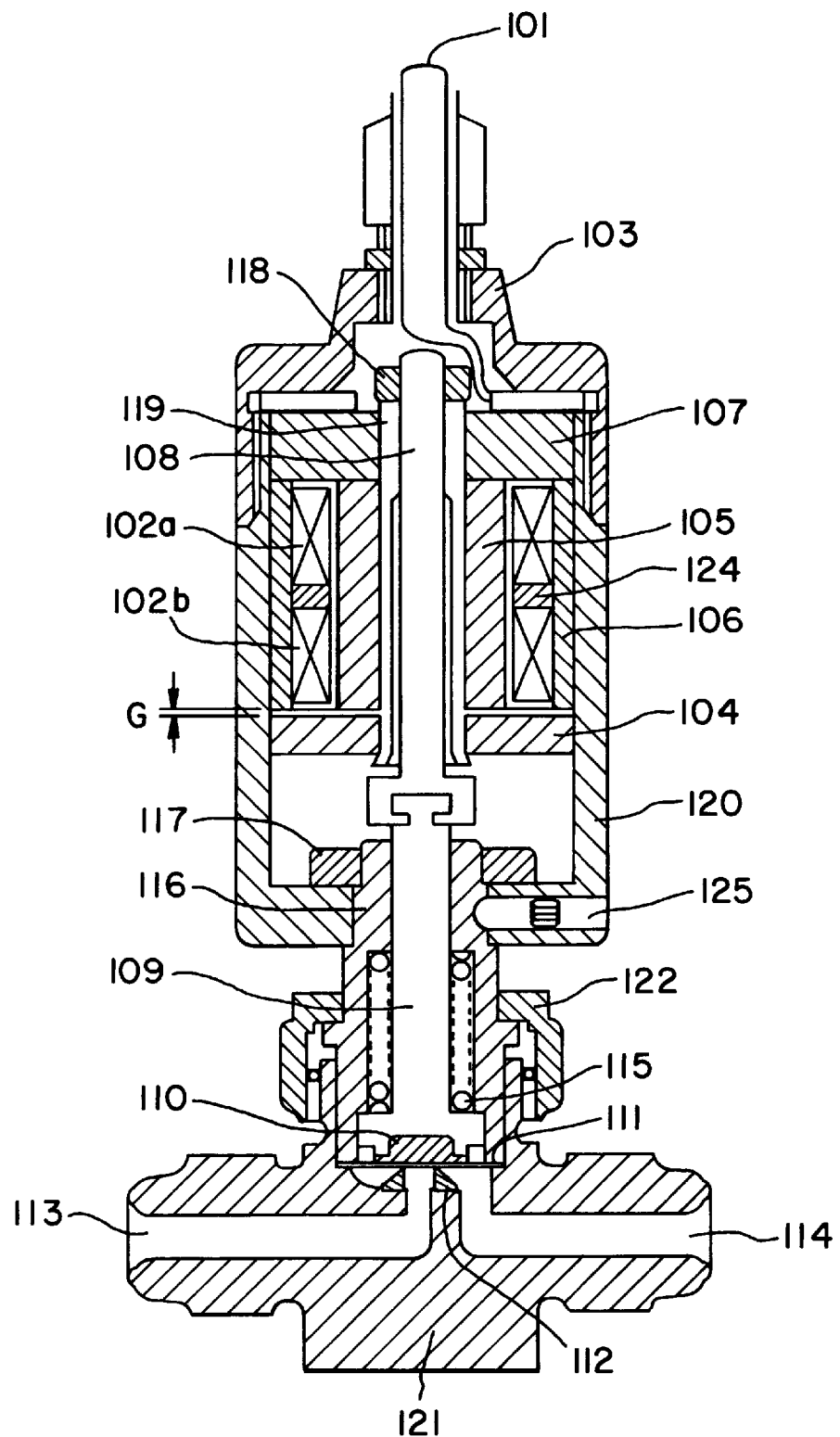
FIG. 13 is a schematic cross sectional view showing an example of a fluid control valve in accordance with the present invention structured in such a manner that the coil 103 which is provided in parallel with the shaft comprises a plurality of coils which are disposed in series.

In a fifth embodiment of the present invention, as shown in FIG. 13, a fluid control valve will be discussed in which the coil 102, which is provided in parallel with the shaft, comprises a plurality of coils disposed in series. The fluid control valve of FIG. 13 has a structure in which members "b", c, and d were all disposed within the fluid control valve of FIG. 1 (member combination 4 of embodiment 3), and all the other points were identical to those of embodiment 3.

In greater detail, the settings were such that the outer diameter of actuator body 120 was 28 mm, while the inner diameter thereof was 23.6 mm, and the height from the upper end surface of actuator body 120 to the central axis of valve body 121 was approximately 102 mm, the distance from the upper end surface of member "d" 107 to the lower end surface of member "a" 104 (when a current is not being conducted was 50.4 mm, the number of turns of coil 102 was 940 T (at 0.3 m$\phi$, 12.6$\Omega$, at 20° C.) and the outer diameter of plunger 119 was 6 mm, while the outer diameter of shaft 108 was 3 mm.

Coil 102 is made into two coils 102a and 102b which are combined in series, and between these coils, a member "e" 124 comprising a magnetic material identical to that of the member "a" was provided.

As a result, when the coil 102 was made into two coils combined in series, in comparison with the case in which coil 102 was a single coil, it was possible to increase the force pulling the member "a" 104 in the direction for the coil at a high speed by means of the electrical field generated by the coil, that is to say, to increase the drive force. Furthermore, by means of providing members "e" (124), the pulling force, that is to say, the drive force, was made uniform.

In a sixth embodiment of the present invention, an example of a fluid supply and exhaust system constructed using the fluid control valve of the present invention will be shown in FIG. 3 and the effects thereof will be explained.

Figure 3:
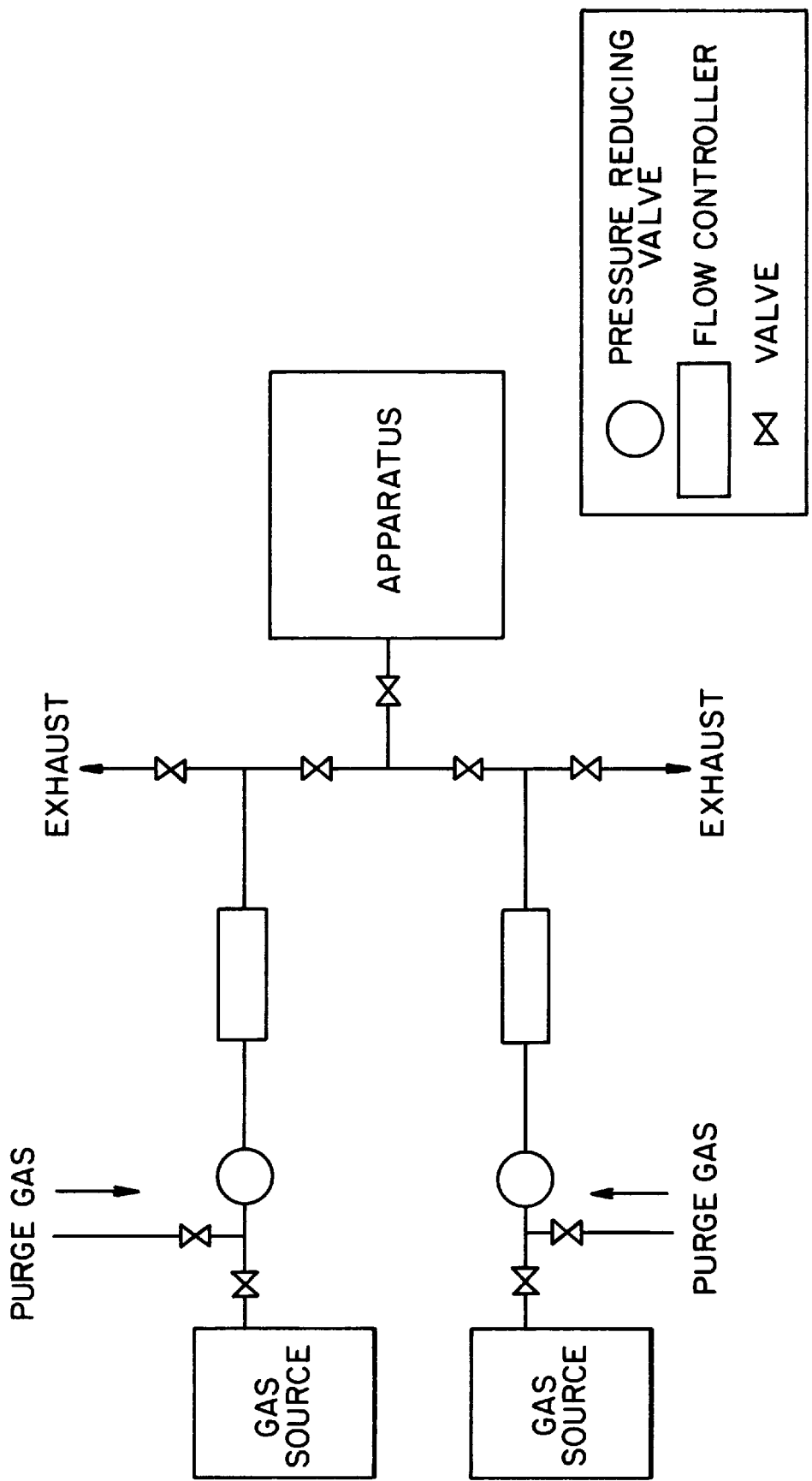
FIG. 3 is a system diagram showing an example of a fluid supply/exhaust system in accordance with the present invention.
Figure 4:
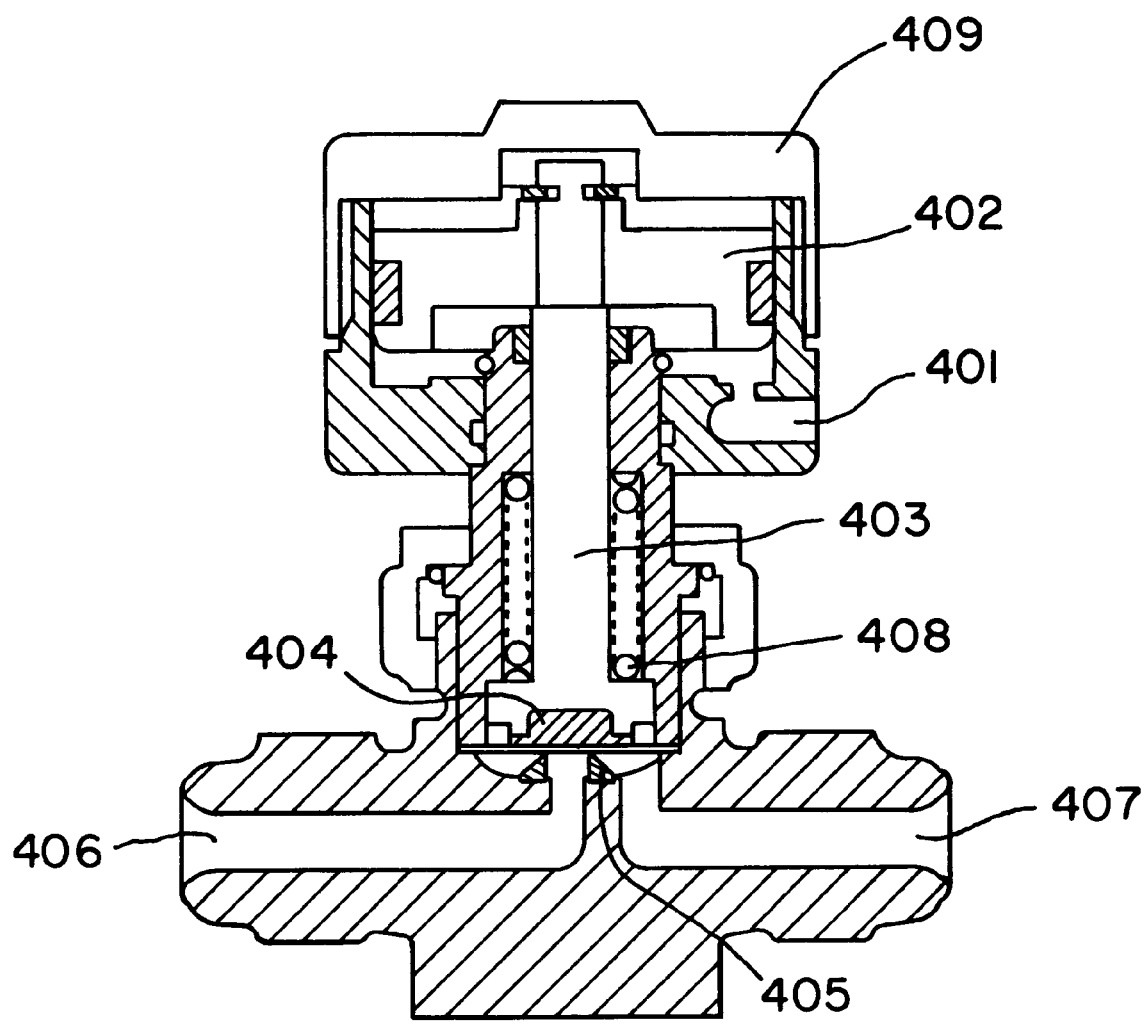
FIG. 4 is a schematic cross sectional view showing a conventional air pressure valve.
Figure 5:
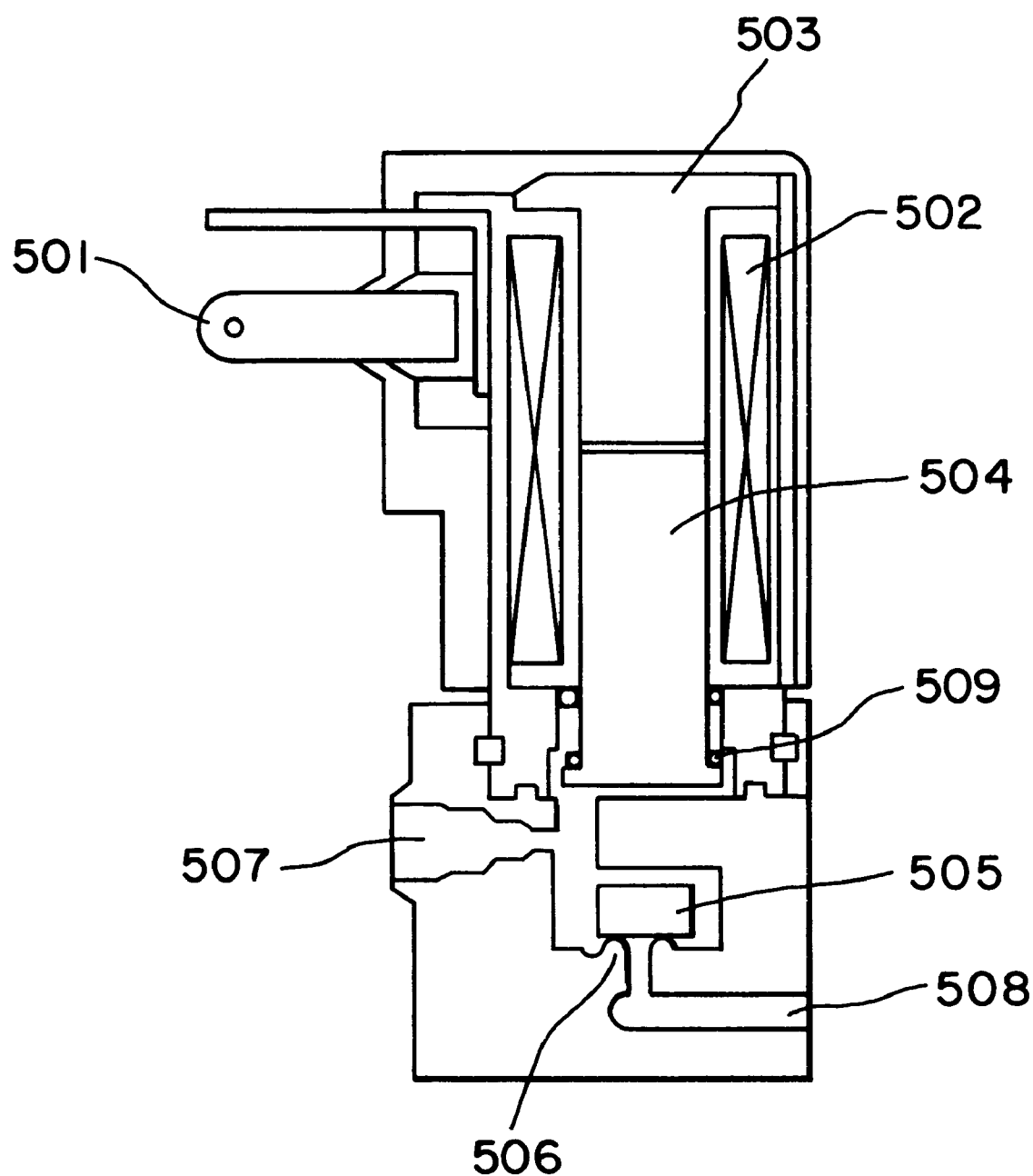
FIG. 5 is a schematic cross sectional view showing a conventional electromagnetic valve.

FIG. 3 is a schematic diagram of a fluid supply and exhaust system comprising a gas source, a flow rate regulator, and a valve, together with devices into which fluid flows from this system.

Furthermore, in the case of the reduced pressure state within the device, when the gas which is normally supplied from the gas source is replaced, valve E is first closed, and next valve D is closed, and then valve C is opened, and the valves are switched in the order B, A (because the gas supplied from the gas source is at a higher pressure than the purged gas). However, when valves in which the response speed is slow, such as conventional air pressure valves, are employed, large irregularities are generated in the operational time of the various valves, so that phenomena such as the admixture of exhaust gases (when the valve C opens prior to the closing of valves E and D) or the admixture of fluid (a purge gas or a gas source gas) (when the opening and closing order of valves A and B is reversed), may occur. Furthermore, when the type of gas source gas is changed, similar phenomena may occur.

In systems employing conventional air pressure type valves, in order to overcome these problems, the length of the instrumentation tubes was appropriately altered, and thereby, the time regulation of the irregularities in the operating time of each valve was conducted.

On the other hand, when such a system is realized using the fluid control valves in the present invention, gas switching with a rapid response time of a few milliseconds is possible using the fluid control valves of the present invention, so that it is possible to overcome the problems such as counter flow and counter dispersion which are generated by the conventional system, and the instrumentation system which was conventionally required was unnecessary, so that the volume taken up by the existing gas system can be greatly reduced.

Figure 10:
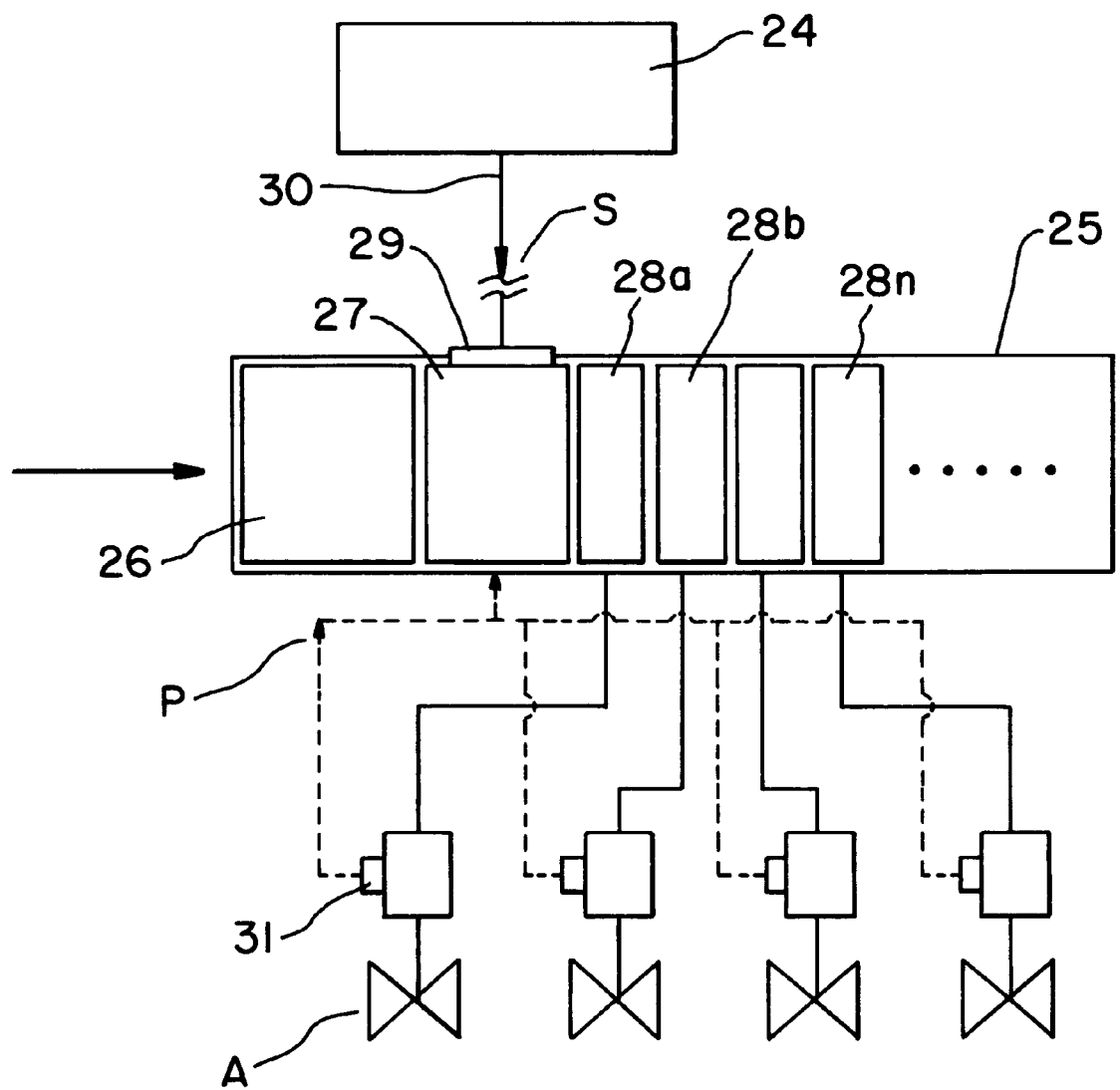
FIG. 10 is a system diagram showing another example of a fluid supply/exhaust system employing fluid control valves in accordance with the present invention.

In a seventh embodiment of the present invention, using FIG. 10, a fluid supply and exhaust system produced using the fluid control valve of the present invention will be explained in further detail.

The fluid supply and exhaust system is structured in such a manner that the control of the opening and closing of a plurality (maximally approximately 20) of fluid control valves by means of an operation signal S from a control computer 24 provided at a central control point is conducted via a unit control apparatus 25 which is provided in the vicinity of the valves.

The unit control apparatus 25 is provided with a power source 26, a control unit 27, drive units 28a through 28n, and a communication port 29, and where necessary, valve opening detectors 31 may be provided at each fluid control valve.

Furthermore, the control computer 24 and the unit control apparatus 25 are connected via a dedicated protocol by means of a central communication system, and operational signal S is provided with respect to each fluid control valve via communication lines 30.

In other words, when operational signal S is inputted into unit control apparatus 25 through communication line 30, drive units 28a through 28n are operated via control valve is set to an ON or OFF state.

Furthermore, where necessary, a signal P indicating the operational state of each fluid control valve is inputted from the opening and closing detectors 31 of each fluid control valve into control unit 27, and this is sent back to control computer 24.

In control unit 27 of unit control apparatus 25, the adjustment control of exciting current I, and the soft landing control of diaphragm 111 during the closing of the valve, are conducted where necessary.

In other words, the drive units of each fluid control valve may be rapidly operated under a high suction force, so that a large exciting current I is required at the initiation of operations. However, as gap G becomes smaller with the opening of the valve, in order to reduce the necessary exciting current I and prevent power consumption and the overheating of coil 102, it is desirable that the exciting current be steadily reduced after the opening of the valve.

Furthermore, diaphragm 111 presses toward the side of valve seat 112 at high speed in such a manner as to create a shock as a result of the elastic forces of spring 115 when exciting current I of coil 102 enters an OFF state, so that this leads to the production of impact noise, or to damage to diaphragm 111 or valve seat 112.

Figure 11:
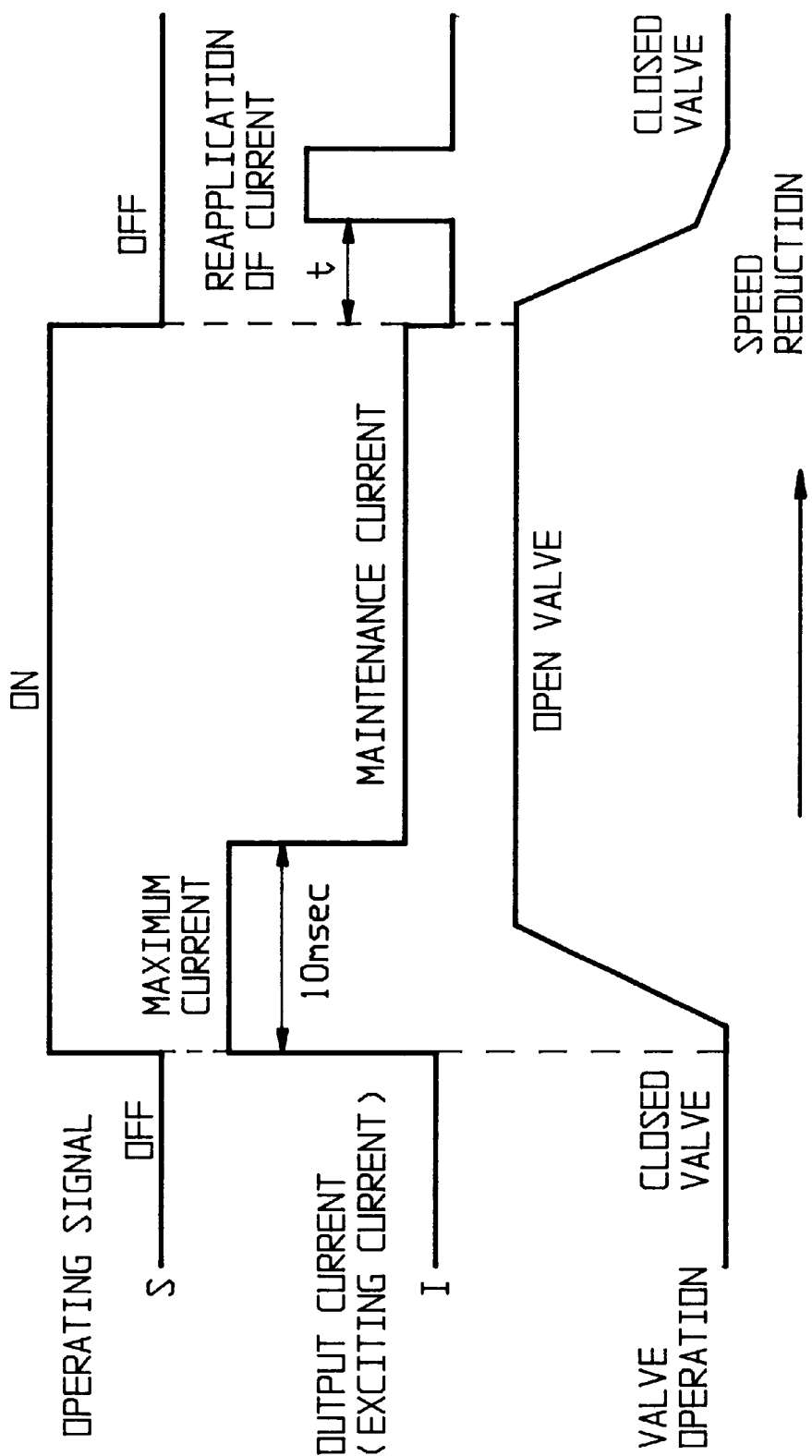
FIG. 11 is an explanatory diagram showing the timing relationship between the operational signal S and exciting current I of the fluid control valve in accordance with the present invention and the operation of diaphragm 11 and the movement of the valve.

For this reason, as shown in FIG. 11, control unit 27 sets the exciting current I to a maximum value during the startup of the valve opening operation (approximately 10 msec), and after the opening of the valve, reduces this to an elastic current I generating a suction force just sufficient to resist the elastic force of spring 115.

As a result, the power consumption in the drive units of each fluid control valve is reduced, and damage to the core 102 resulting from overheating is prevented.

If, for example, the upper limit of the temperature is set to 30° C., when the time during which the current is initially conducted (the state of the maximum exciting current) is 0.1 seconds, then it is not possible to set the repeated opening and closing periods of the fluid control valves at less than approximately 3.6 seconds, and if the opening and closing periods are set to 3.6 seconds or less, the increase in temperature will exceed 30° C.

In contrast, if the initial period of current is set to 0.01 seconds as shown in FIG. 11, then the minimum repeating opening and closing period when the upper limit of the temperature is set at 30° C. can be reduced by approximately 1.5 times.

Furthermore, as the soft landing control of diaphragm 11, as shown in FIG. 11, after exciting current I has been set to the off state, control unit 27 causes the conduction of current for a short period of time after the passage of t msec. By means of this, the compressive force in the downward direction form spring 115 is reduced, and since the valve closing speed is reduced, the shock of the impact of diaphragm 111 with respect to valve seat 112 can be prevented.

The timing of the re-amplification of exciting current I in FIG. 11 may be by means of a method in which the time t from the point at which the operating signal S enters an OFF state to the initiation of the current (see FIG. 11) is set in advance; however, in addition to this, a method in which a so called trigger signal for re-sending the current is obtained by means of the operation of a switch mechanism or a potentiosensor provided at the fluid control valve side.

Furthermore, as the soft landing control, a method may be employed in which a physical control method is employed in place of electrical control; for example, the low inner space of actuator body 120 may be filled with a gel-form semifluid material, and a so-called dampening effect may be exercised thereby during the decent of valve rod 109 during the closing of the valve.

Furthermore, although not depicted in the mode shown in FIG. 1, in order to miniaturize the drive units of the fluid control valves, it necessary to reduce the magnetic resistance of the part of gap G corresponding to the valve stroke. For this reason, a method may be adopted in which a magnetic fluid is placed within gap G in freely chargeable and dischargeable manner, and during the attachment operation of member "a" 104, the magnetic fluid flows outward from with gap G. so as not to present an obstacle to the movement of member "a" 104. By means of this it is possible to achieve an approximately 10 to 20 percent reduction in volume of the drive unit of the fluid control valve in FIG. 1.

Furthermore, in the fluid control valve of FIG. 1, there is a possibility that impact noise will be produced by the impact of member "a" 104 into the end surface of member "b" 105 or member "c" 106 during the valve opening operation. For this reason, a sheet comprising tetrafluoroethylene resin having a thickness of approximately 0.05 mm was inserted at the end surfaces of member "a" 104 and member "b" 105 or member "c" 106, and thereby, it was confirmed that the impact noise could be reduced without having a large effect on the suction force F. Similar effects can be expected if the resin film comprises a compound other than tetrafluoroethylene resin such as, for example, trifluoroethylene resin, silicon resin, or the like. Furthermore, in the present embodiment, the thickness of this resin film was set to approximately 0.05 mm; however, this thickness may be appropriately set in accordance with the size of the valve stroke.

Figure 12:
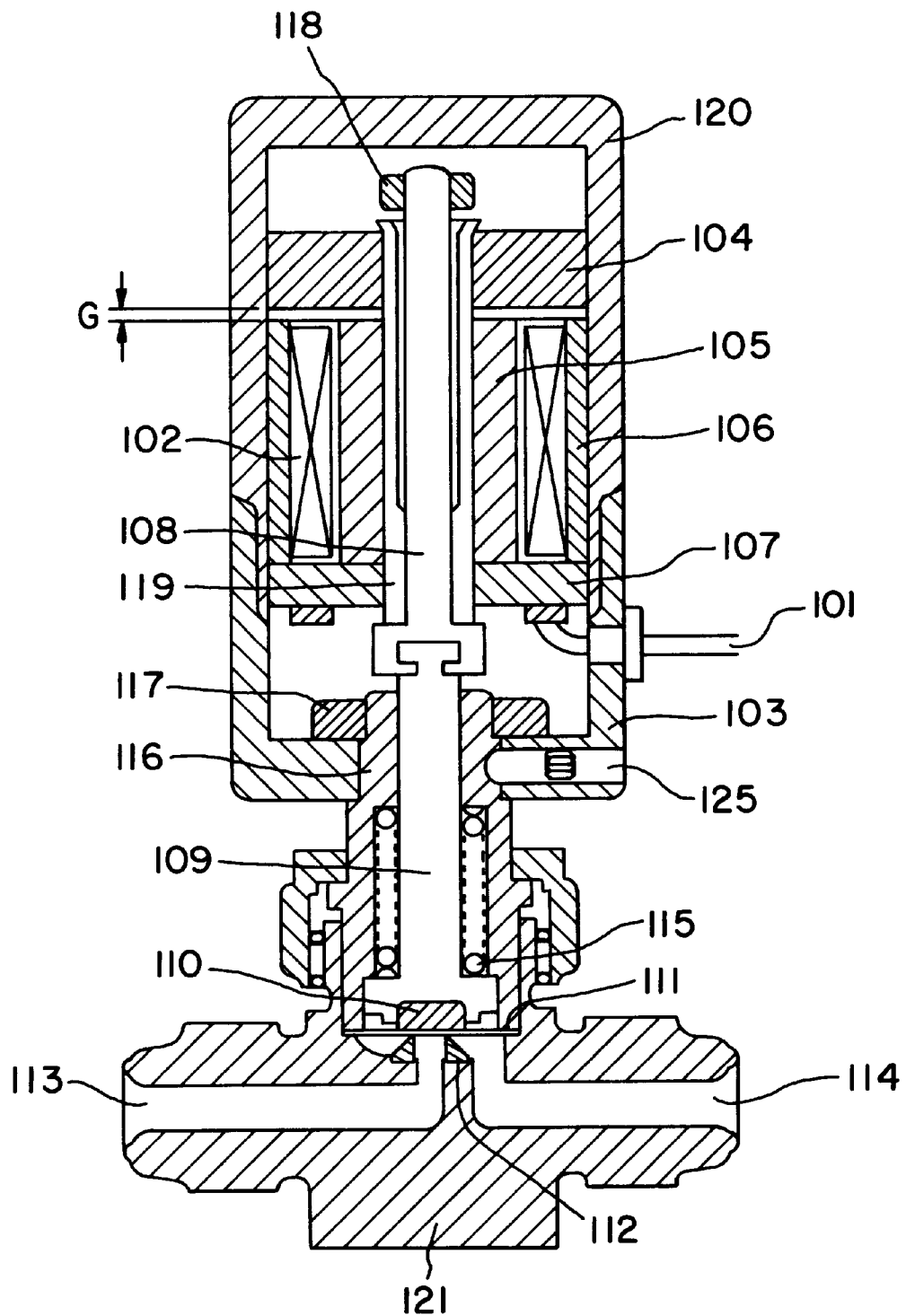
FIG. 12 is a schematic cross sectional view showing example of a fluid control valve in accordance with the present invention which is of the normally open type.

FIG. 12 shows another example of a fluid control rod in accordance with the present invention; this is a normally open type valve.

In the fluid control valve of FIG. 12, the shaft 108 is constantly urged in an upward direction by spring 115, and diaphragm 111 is separated from valve seat 112, and fluid constantly flows from fluid input port 113, to fluid output port 114 (the state in which the valve is opened).

On the other hand, when coil 102 is excited, the shaft 108 and plunger 119 which adhere to member "a" 104 are pushed in a downward direction and diaphragm 111 comes into contact with valve seat 112 and thereby, the flow of fluid from fluid input port 113 to fluid output port 114 is stopped (the state in which the valve is closed).

The structure of the fluid control valve of FIG. 12 is completely identical to that in the case of FIG. 1.

FIG. 14 shows another example of a fluid control valve in accordance with the present invention; a bellows is installed around the valve holder. The other points are completely identical to that of the structure of the fluid control valve shown in FIG. 1.

By installing a bellows around the valve holder, a fluid control valve is obtained which has superior durability in the opening and closing of the valve.

Industrial Applicability

As described above, by means of the present invention, a fluid control valve and fluid supply and exhaust system are obtained in which it is possible to stable control a fluid at a pressure of approximately 10 kg/cm$^2$, in which the valve response time is rapid, at a few milliseconds, in which the miniaturization for the valve is possible, and in which there is little gas counter flow when the construction involves a plurality of valves.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fluid control valve which controls a fluid moving through a valve body by means of opening and closing a portion between a valve seat and a valve holder, said fluid control valve comprising:

a drive unit having a valve rod, a rod shaped shaft for applying pressure to said valve seat via said valve rod, and a member "a" which is affixed around said rod shaped shaft;

said member "a" formed of a magnetic material;

a coil having a space between it and said shaft, said member "a" provided at a position parallel to said shaft moving upwardly and downwardly by electromagnetic induction;

a spring, whereby the portion between the valve seat and the valve holder is opened and closed; and a member "b" comprises a magnetic material identical to that of said member "a" and is provided in said gap between said shaft and said coil.

2. A fluid control valve in accordance with claim 1, wherein said valve holder comprises a diaphragm and a diaphragm holder.

3. A fluid control in accordance with claim 1, wherein a bellows is installed around said valve holder.

4. A fluid control valve in accordance with claim 1, wherein said member "a" comprises a magnetic material comprising an iron-cobalt system having a saturation magnetic density of 2 T (Teslas) or more.

5. A fluid control in accordance with claim 1, wherein said member "a" comprises a magnetic material comprising an iron-nickel system alloy having a saturation magnetic density of 2 T (Teslas) or more.

6. A fluid control valve in accordance with claim 1, wherein a member "c" comprises a magnetic material identical to that of said member "a" and is provided at a position in opposition to member "b" thereby sandwiching said coil.

7. A fluid control valve in accordance with claim 1, wherein a member "d" comprises a magnetic material identical to that of said member "a" and is provided at a position in opposition to member "a" thereby sandwiching said coil.

8. A fluid control valve in accordance with claim 1, wherein said magnetic material contains vanadium in an amount of 5 percent by weight or less.

9. A fluid control valve in accordance with claim 1, wherein an exciting current is supplied to said coil, said excited current supplied in a divided manner as a large initial drive current up to the point of valve opening, and a small maintenance current for maintaining the opened state of the valve after the valve is opened.

10. A fluid control valve in accordance with claim 9, wherein an exciting current is supplied to said coil, and after said exciting current supplied to said coil is cut off, an exciting current is resupplied to said coil for a brief period after a passage of a short time t.

11. A fluid control valve in accordance with claim 1, wherein a magnetic fluid fills gap G between said coil and said member "a" in a freely chargeable and dischargeable manner.

12. A fluid control and exhaust system comprising a structure which employs fluid control valves in accordance claim 1.

13. A fluid control and exhaust system in accordance with claim 12, wherein the structure comprises said fluid control valves, a unit control apparatus which is provided with a power source, a control unit, and a plurality of drive units, a control computer which is provided at a remote central control point, and communication lines which connect said control computer and said unit control apparatus, and operation of each fluid control valve is controlled by means of an operational signal S from said control computer.

14. A fluid supply and exhaust system in accordance with claim 13, wherein opening and closing detectors are provided for each said fluid control valve, and the opening and closing state thereof is communicated to said control computer from said opening and closing detectors via said unit control apparatus by means of a signal P.

15. A fluid control valve which controls a fluid moving through a valve body by means of opening and closing a portion between a valve seat and a valve holder, said fluid control valve comprising:

a drive unit having a valve rod, a rod shaped shaft for applying pressure to said valve seat via said valve rod, and a member "a" which is affixed around said rod shaped shaft;

said member "a" formed of a magnetic material;

a coil having a space between it and said shaft, said member "a" provided at a position parallel to said shaft moving upwardly and downwardly by electromagnetic induction;

a spring, whereby the portion between the valve seat and the valve holder is opened and closed; and said coil is provided at a position in parallel to said shaft and comprises a plurality of coils arranged in series.

16. A fluid control valve which controls a fluid moving through a valve body by means of opening and closing a portion between a valve seat and a valve holder, said fluid control valve comprising:

a drive unit having a valve rod, a rod shaped shaft for applying pressure to said valve seat via said valve rod, and a member "a" which is affixed around said rod shaped shaft;

said member "a" formed of a magnetic material;

a coil having a space between it and said shaft, said member "a" provided at a position parallel to said shaft moving upwardly and downwardly by electromagnetic induction;

a spring whereby the portion between the valve seat and the valve holder is opened and closed;

said coil is provided at a position in parallel to said shaft and comprises a plurality of coils arranged in series; and members "e" comprise a magnetic material identical to that of said member "a" are provided between said plurality of coils arranged in series.

17. A fluid control valve which controls a fluid moving through a valve body by means of opening and closing a portion between a valve seat and a valve holder, said fluid control valve comprising:

a drive unit having a valve rod, a rod shaped shaft for applying pressure to said valve seat via said valve rod, and a member "a" which is affixed around said rod shaped shaft;

said member "a" formed of a magnetic material;

a coil having a space between it and said shaft, said member "a" provided at a position parallel to said shaft moving upwardly and downwardly by electromagnetic induction;

a spring, whereby the portion between the valve seat and the valve holder is opened and closed; and a resin film having a predetermined thickness is interposed between said member "a", and said member "b".

* * * * *